（12) United States Patent
Shelestak et al.

US008304358B2

(10) Patent No.: US 8,304,358 B2
(45) Date of Patent: Nov. 6, 2012

(54) METHOD OF REDUCING REDOX RATIO OF MOLTEN GLASS AND THE GLASS MADE THEREBY

(75) Inventors: Larry J. Shelestak, Bairdford, PA (US); Ronald L. Shewenninger, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 528 days.

(21) Appl. No.: 12/275,264

(22) Filed: Nov. 21, 2008

(65) Prior Publication Data
US 2010/0126218 A1    May 27, 2010

(51) Int. Cl.
*C03C 3/087*    (2006.01)
(52) U.S. Cl. .......................................... 501/70; 501/64
(58) Field of Classification Search .................. 501/70, 501/71, 64
See application file for complete search history.

(56) References Cited

U.S. PATENT DOCUMENTS

| | | | |
|---|---|---|---|
| 2,038,627 A | 4/1936 | Badger | 49/78.1 |
| 2,254,079 A | 8/1941 | McAlpine | 49/54 |
| 2,274,643 A | 3/1942 | Adams | 49/77 |
| 2,330,324 A | 9/1943 | Adams | 49/77 |
| 2,331,052 A | 10/1943 | Shadduck | 49/77 |
| 2,387,222 A | 10/1945 | Wright | 49/54 |
| 3,208,841 A | 9/1965 | Burch | 65/179 |
| 3,353,941 A | 11/1967 | Hanks et al. | |
| 3,414,396 A | 12/1968 | Brichard | 65/134 |
| 3,669,435 A | 6/1972 | Silverberg | 263/40 R |
| 3,716,349 A | 2/1973 | Deeg et al. | 65/32 |
| 3,811,860 A | 5/1974 | Nier | 65/135 |
| 4,224,927 A | 9/1980 | Patil | 126/449 |
| 4,354,866 A | 10/1982 | Mouly | 65/99.5 |
| 4,466,562 A | 8/1984 | DeTorre | 225/2 |
| 4,599,100 A | 7/1986 | Demarest, Jr. | |
| 4,634,461 A | 1/1987 | Demarest, Jr. et al. | |
| 4,671,155 A | 6/1987 | Goldinger | 83/886 |
| 4,792,536 A | 12/1988 | Pecoraro et al. | 501/70 |
| 5,006,144 A | 4/1991 | Knavish et al. | 65/134 |
| 5,030,593 A | 7/1991 | Heithoff | 501/72 |
| 5,030,594 A | 7/1991 | Heithoff | 501/72 |
| 5,253,105 A | 10/1993 | Paul et al. | 359/359 |
| 5,447,547 A | 9/1995 | Goldfarb et al. | |
| 5,509,951 A | 4/1996 | Baucke et al. | 65/134.6 |
| 5,632,795 A | 5/1997 | Brown et al. | |
| 5,755,846 A | 5/1998 | Wagner et al. | |
| 5,830,812 A | 11/1998 | Shelestak et al. | 501/71 |
| 5,897,956 A | 4/1999 | Kijima et al. | 428/426 |
| 6,218,323 B1 | 4/2001 | Bretschneider et al. | |
| 6,237,369 B1 | 5/2001 | LeBlanc et al. | |
| 6,407,021 B1 | 6/2002 | Kitayama et al. | |
| 6,461,736 B1 * | 10/2002 | Nagashima et al. | 428/432 |
| 6,532,771 B1 | 3/2003 | Kobayashi et al. | |
| 6,548,434 B2 * | 4/2003 | Nagashima | 501/70 |
| 6,576,807 B1 | 6/2003 | Brunelot et al. | |
| 6,610,622 B1 | 8/2003 | Landa et al. | |
| 6,673,730 B1 | 1/2004 | Shelestak | 501/71 |
| 6,705,118 B2 | 3/2004 | Simpson et al. | |
| 6,831,030 B2 * | 12/2004 | Koyama et al. | 501/70 |
| 6,844,280 B2 * | 1/2005 | Koyama et al. | 501/70 |
| 6,871,514 B2 | 3/2005 | Muschik et al. | 65/33.9 |
| 6,878,653 B2 | 4/2005 | Kitayama et al. | |
| 6,903,037 B2 | 6/2005 | Koyama et al. | |
| 6,962,887 B2 * | 11/2005 | Heithoff | 501/64 |
| 7,071,134 B2 | 7/2006 | Koyama et al. | |
| 7,169,722 B2 * | 1/2007 | Landa et al. | 501/71 |
| 7,435,696 B2 | 10/2008 | Scheffler-Hudlet et al. | |
| 7,498,731 B2 | 3/2009 | Fechner et al. | |
| 7,557,053 B2 * | 7/2009 | Thomsen et al. | 501/70 |
| 7,560,402 B2 | 7/2009 | Thomsen et al. | |
| 7,562,538 B2 | 7/2009 | Landa et al. | |
| 7,582,582 B2 | 9/2009 | Teyssedre | |
| 7,601,660 B2 * | 10/2009 | Tullman et al. | 501/70 |
| 7,669,439 B2 | 3/2010 | Simpson et al. | |
| 7,700,869 B2 | 4/2010 | Thomsen et al. | |
| 7,700,870 B2 | 4/2010 | Thomsen et al. | |
| 7,713,895 B2 | 5/2010 | Maquin et al. | |

(Continued)

FOREIGN PATENT DOCUMENTS

| | | |
|---|---|---|
| EP | 1 201 615 A1 | 5/2002 |
| EP | 1 281 687 A1 | 2/2003 |
| EP | 1 291 330 A2 | 3/2003 |
| GB | 1159647 | 7/1969 |
| JP | 72024927 | 7/1972 |
| JP | 2007238398 A | 9/2007 |
| WO | WO 99/31021 A1 | 6/1999 |
| WO | WO 2004/063106 A2 | 7/2004 |
| WO | 2007106226 A1 | 9/2007 |
| WO | 2009115725 A2 | 9/2009 |

OTHER PUBLICATIONS

International Search Report, PCT/US2009/064557, dated Jan. 28, 2010.
"Laboratory air bubble generation of various size distributions," Review of Scientific Instruments, vol. 75, No. 11, Nov. 2004, p. 4558-4563, by J.A.Puleo et al.
"Bubbling Gas Through the Glass in the Batch Zone," translated from Steklo i Keramika, No. 7, p. 23-24, Jul. 1979, by I.Z.Federov.
"Reducing the sulphate content of soda-lime-silica glasses with the aid of physical refining," Glastechn. Ber., vol. 63, No. 7, 1990, p. 198-203, by S.Rudolph et al.
"The Fining of Glass by Introducing Additional Gases in the Melt," Glass Industry, Sep. 1956, p. 496-499, 520, 522, by J.Widtmann.
"Recommendations on the use of Impulse Bubbling in Glass Tank Furnaces," translated from Steklo i Keramika, No. 3, p. 19-21, Mar. 1973, by K.A.Pchelyakov et al.

(Continued)

*Primary Examiner* — Karl Group
*Assistant Examiner* — Elizabeth A Bolden
(74) *Attorney, Agent, or Firm* — Andrew C Siminerio

(57) ABSTRACT

A soda-lime-silica glass for solar collector cover plates and solar mirrors has less than 0.010 weight percent total iron as $Fe_2O_3$, a redox ratio of less than 0.350, less than 0.0025 weight percent $CeO_2$, and spectral properties that include a visible transmission, and a total solar infrared transmittance, of greater than 90% at a thickness of 5.5 millimeters, and reduced solarization. In one non-limiting embodiment of invention, the glass is made by heating a pool of molten soda-lime-silica with a mixture of combustion air and fuel gas having an air firing ratio of greater than 11, or an oxygen firing ratio of greater than 2.31. In another non-limiting embodiment of the invention, streams of oxygen bubbles are moved through a pool of molten glass. In both embodiments, the oxygen oxidizes ferrous iron to ferric iron to reduce the redox ratio.

10 Claims, 3 Drawing Sheets

UNITED STATES PATENT AND TRADEMARK OFFICE
CERTIFICATE OF CORRECTION

PATENT NO.       : 8,304,358 B2
APPLICATION NO.  : 12/275264
DATED            : November 6, 2012
INVENTOR(S)      : Larry J. Shelestak and Ronald L. Schwenninger Page 1 of 1

It is certified that error appears in the above-identified patent and that said Letters Patent is hereby corrected as shown below:

Title Page, Item [75] Inventor

"Shewenninger" should read as follows:

-- Schwenninger --

Signed and Sealed this
Thirtieth Day of July, 2013

Teresa Stanek Rea
*Acting Director of the United States Patent and Trademark Office*

U.S. PATENT DOCUMENTS

| | | | |
|---|---|---|---|
| 7,732,360 B2 * | 6/2010 | Cid-Aguilar et al. | 501/70 |
| 7,743,630 B2 | 6/2010 | Krasnov et al. | |
| 7,825,051 B2 | 11/2010 | Smith et al. | |
| 7,893,350 B2 | 2/2011 | Thomsen et al. | |
| 7,946,129 B2 | 5/2011 | Wu et al. | |
| 2002/0152770 A1 | 10/2002 | Becher et al. | |
| 2003/0199384 A1 | 10/2003 | Landa et al. | |
| 2004/0043886 A1 | 3/2004 | Akada et al. | |
| 2005/0039804 A1 | 2/2005 | Kim | |
| 2005/0233891 A1 | 10/2005 | Cid-Aguilar et al. | |
| 2007/0015654 A1 * | 1/2007 | Scheffler-Hudlet et al. | 501/70 |
| 2007/0137259 A1 | 6/2007 | Borders et al. | |
| 2007/0209698 A1 * | 9/2007 | Thomsen et al. | 136/259 |
| 2007/0215205 A1 | 9/2007 | Thomsen et al. | |
| 2007/0243993 A1 | 10/2007 | Heithoff et al. | |
| 2008/0085827 A1 * | 4/2008 | Thomsen et al. | 501/60 |
| 2008/0090718 A1 | 4/2008 | Landa et al. | |
| 2010/0122728 A1 * | 5/2010 | Fulton et al. | 136/256 |
| 2010/0126218 A1 | 5/2010 | Shelestak et al. | |
| 2010/0154477 A1 | 6/2010 | Thomsen et al. | |
| 2010/0255980 A1 | 10/2010 | Fulton et al. | |
| 2010/0297415 A1 | 11/2010 | Cid-Aguilar et al. | |
| 2010/0300153 A1 | 12/2010 | Zhang et al. | |
| 2010/0304949 A1 | 12/2010 | Sachot et al. | |
| 2010/0313604 A1 | 12/2010 | Watson et al. | |
| 2011/0098171 A1 | 4/2011 | Pedeboscq et al. | |
| 2011/0135938 A1 | 6/2011 | Kim et al. | |

OTHER PUBLICATIONS

U.S. Appl. No. 12/031,303, filed Feb. 14, 2008.
Patent Search conducted by PRV InterPat.
Patent Search conducted by Jennifer P. Yancy, Esq, of Yancy IP Law, PLLC, dated Jul. 27, 2011.
Glass analysis, KRYSTAL_CL, dated Mar. 27, 1998.
Glass analysis, Waterwhite, dated Sep. 18, 1993.
Glass analysis, ULTRA_CLEAR, dated Aug. 27, 2007.

* cited by examiner

METHOD OF REDUCING REDOX RATIO OF MOLTEN GLASS AND THE GLASS MADE THEREBY

BACKGROUND OF THE INVENTION

1. Field of the Invention

This invention relates to a method of reducing the redox ratio ($FeO/Fe_2O_3$) of molten glass, and the glass made thereby, and more particularly, to a method of introducing oxygen into molten glass having a low iron content to oxidize the iron in the ferrous state ($Fe^{++}$) to reduce the redox ratio.

2. Discussion of the Presently Available Technology

Solar collectors and solar mirrors use solar energy to heat a fluid, e.g. as disclosed in U.S. Pat. Nos. 4,224,927 and 5,253,105, or to convert solar energy to electrical energy. In general, the solar collectors have a cover plate to pass the solar energy, to reduce heat loss due to convection, and to protect the photovoltaic cells of the electric power generating solar collectors, and the solar mirrors have a glass substrate to pass the solar energy to a reflective coating and reflect the solar energy back through the glass substrate to direct the solar energy to a designated area. Of particular interest in the following discussion are the glass cover plates and the glass substrates.

As is appreciated by those skilled in the art, the glass cover plates used for photovoltaic cover plates, and the glass substrates used for solar mirrors preferably above 380 nanometers ("nm") of the electromagnetic spectrum have a high transmission, e.g. above 90% in the visible and the infrared ("IR") range, and a low absorption, e.g. below 2% in the visible and the IR ranges. As is appreciated by those skilled in the art, the particular visible and IR range of the electromagnetic spectrum, and the peak transmission varies depending on the semi-conductor material of the photovoltaic cell. For example and not limiting to the discussion, for a silicon photovoltaic solar cell, the preferred visible and IR wavelength range is 380-1200 nm, and the peak transmission is at about 900 nm.

Generally, in the manufacture of flat glass, glass batch materials are melted; the molten glass is fined and homogenized, and the fined homogenized molten glass is formed into a flat glass ribbon by controllably decreasing the temperature of the molten glass as it floats on a molten metal bath. During the fining of the molten glass, gas bubbles are removed from the molten glass by additions of ingredients to the batch materials, and/or by moving gases, e.g. carbon monoxide and oxygen through the molten glass, e.g. see U.S. Pat. Nos. 2,330,324 and 6,871,514. The batch materials for making glasses having high transmission, and low absorption, in the visible and the IR range of the electromagnetic spectrum have no additions of colorants. As is appreciated by those skilled in the art, additions of colorants to the batch materials have been used to, among other things, reduce the transmission and increase the absorption in the visible and IR range of the subsequently formed glass. Glasses having high visible and IR transmission are usually referred to as low iron glasses. U.S. Pat. Nos. 5,030,593; 5,030,594, and 6,962,887 disclose the making of low iron glasses that are almost colorless by processing raw glass batch materials that have a very low content of total iron expressed as $Fe_2O_3$, e.g. less than 0.020% by weight (hereinafter also referred to as "wt %" or "wt. %"). Iron contents of less than 0.020% by weight (200 parts per million (hereinafter also referred to as "ppm")) in batch materials are referred to as tramp iron because the iron is not added to the batch material but is present as an impurity in the ingredients of the batch material.

Even though the iron content is low in low iron glasses, it is also preferred to reduce the weight percent of ferrous iron ($Fe^{++}$) in the glass to maximize the transmission, and minimize the absorption of the glass in the visible and IR range of the electromagnetic spectrum. As is appreciated by those skilled in the art, iron in the ferric state is a less powerful colorant than iron in the ferrous state and shifts the transmittance spectrum of the glass toward yellow and away from the usual green-blue effect of the ferrous iron in glass. Stated another way, increasing iron in the ferric state while decreasing iron in the ferrous state, increases the transmission, and decreases the absorption of the glass in the visible and the IR range. One technique to reduce the weight percent of ferrous iron in the glass is to include cerium oxide in the glass batch materials because cerium oxide in the glass "decolorizes" the glass. More particularly, cerium oxide is not a colorant in glass, but is a powerful oxidizing agent in glass, and its function in decolorized glass is to oxidize the iron in the ferrous state ($Fe^{++}$) to iron in the ferric ($Fe^{+++}$) state. Although cerium oxide is useful to decolorize the remaining traces of ferrous iron, the use of cerium oxide has limitations, e.g. but not limiting to the discussion, when the glass is to be used as cover plates for electric power generating solar collectors and as glass substrates for solar mirrors. More particularly, exposing low iron glass cover plate having cerium oxide to the sun has a solarizing effect on the glass, which results from the photo-oxidation of $Ce^{+++}$ to $Ce^{++++}$ and the photo-reduction of $Fe^{+++}$ to $Fe^{++}$. As is appreciated by those skilled in the art, the solarization effect of cerium and the photo-reduction of $Fe^{+++}$ to $Fe^{++}$ reduces the transmission, and increases the absorption, of the glass in the visible and the IR range of the electromagnetic spectrum, which reduces the power generation of the solar cells.

As can now be appreciated, it would be advantageous to provide a low iron glass that has low levels of iron in the ferrous state ($Fe^{++}$) and does not have the limitation of the photo-reduction of iron in the ferric state ($Fe^{+++}$) to iron in the ferrous state ($Fe^{++}$).

SUMMARY OF THE INVENTION

This invention relates to a soda-lime-silica glass, having, among other things:

| | |
|---|---|
| $SiO_2$ | 65-75 weight percent |
| $Na_2O$ | 10-20 weight percent |
| CaO | 5-15 weight percent |
| MgO | 0-5 weight percent |
| $Al_2O_3$ | 0-5 weight percent |
| $K_2O$ | 0-5 weight percent |
| $SO_3$ | 0-0.30 weight percent |
| Total iron as $Fe_2O_3$ | 0.005-0.120 weight percent |
| Redox ratio | less than 0.550 | wherein the glass has less than 0.0025 weight percent of $CeO_2$. The spectral properties of the glass measured at a thickness 5.5 millimeters include, among other things, a visible transmission of greater than 85% measured using C.I.E. standard illuminant "A" with a 2° observer over a wavelength range of 380 to 770 nanometers; a total solar infrared transmittance of greater than 87% measured over a wavelength range of 775 to 2125 nanometers, and a total solar energy transmittance of greater than 89% measured over a wavelength range of 300 to 2500 nanometers, wherein the total solar infrared transmittance and the total solar energy transmittance are calculated using Parry Moon air mass 2.0 direct solar irradiance data and ASTM air mass 1.5 global solar irradiance data respectively, and integrated using the Rectangular Rule and Trapezoidal Rule, respectively.

Further, the invention relates to a method of reducing redox ratio of soda-lime-silica glass by, among other things, heating a pool of molten soda-lime-silica glass having iron in a ferrous state ($Fe^{++}$) and in a ferric state ($Fe^{+++}$), wherein the pool of molten glass is heated with an ignited mixture of combustion gas and fuel gas emanating from one or more burners, wherein flow of the combustion gas exceeds the amount of combustion gas required to ignite the fuel gas such that excess oxygen of the combustion gas oxidizes the iron in the ferrous state to iron in the ferric state to reduce the redox ratio. Optionally oxygen gas can simultaneously be moved through the pool of molten glass wherein flow of the oxygen gas is in a direction from bottom of the pool of molten glass to top of the pool.

Still further, the invention relates to a method of reducing redox ratio of soda-lime-silica glass by, among other things, heating a pool of molten soda-lime-silica glass in a heating chamber, the pool of molten glass having iron in a ferrous state ($Fe^{++}$) and in a ferric state ($Fe^{+++}$); moving glass batch materials onto the pool of molten glass contained in the heating chamber, the batch materials having iron in the ferrous state ($Fe^{++}$) and in the ferric state ($Fe^{+++}$); melting the glass batch materials as they float on surface of the molten pool of glass; moving oxygen through the pool of molten glass to oxidize the ferrous iron to the ferric iron to reduce the redox ratio, and forming a glass ribbon from the pool of molten glass.

BRIEF DESCRIPTION OF THE DRAWINGS

FIG. 1A is the melting section of the furnace, and FIG. 1B is the refining and homogenizing section of the furnace.

DETAILED DESCRIPTION OF THE INVENTION

Figure 1:
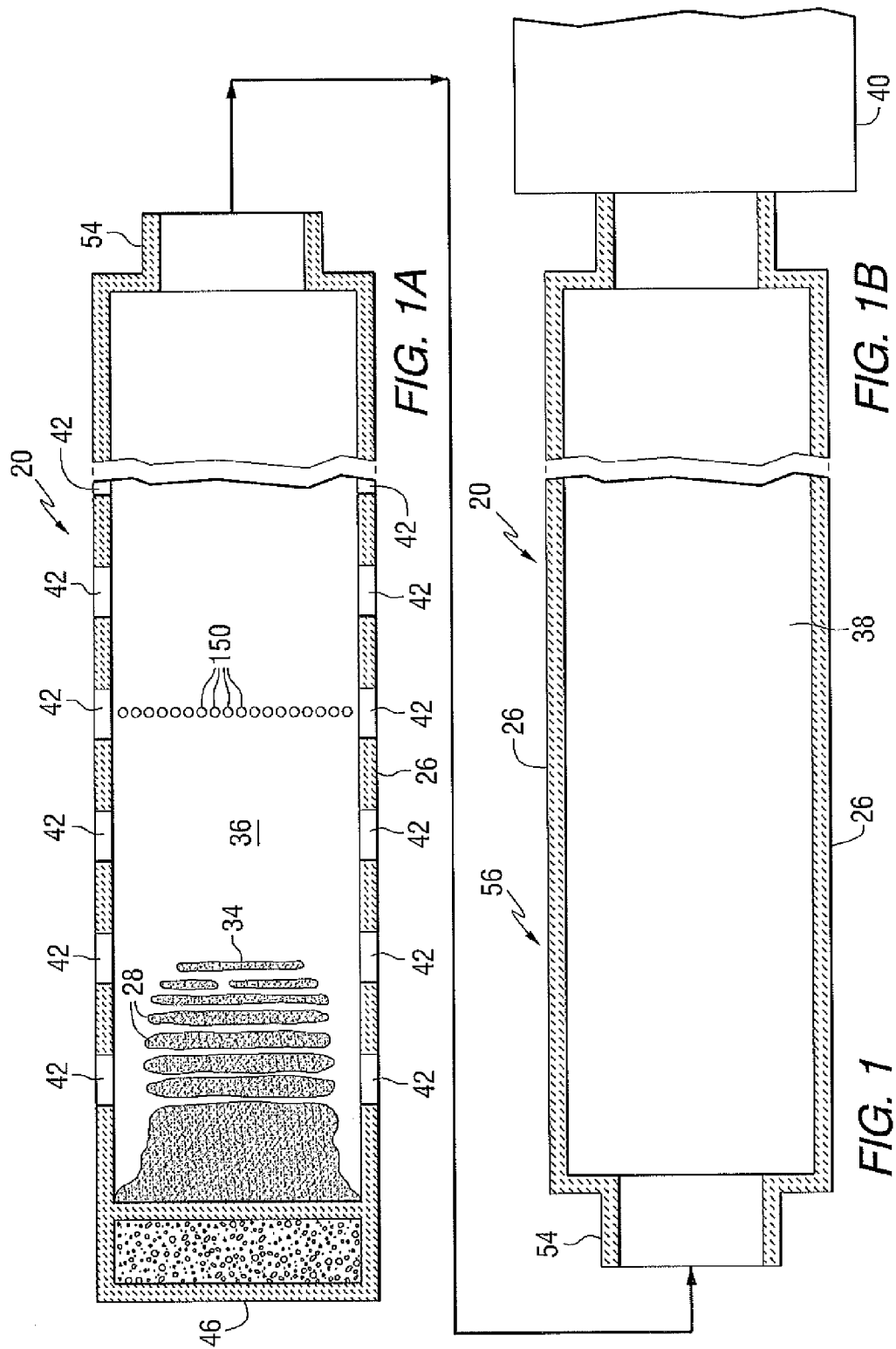
FIG. 1 is a horizontal section of a glass melting furnace that can be used in the practice of the invention.

As used herein, spatial or directional terms, such as "inner", "outer", "left", "right", "up", "down", "horizontal", "vertical", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired property desired and/or sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between and inclusive of the minimum value of 1 and the maximum value of 10; that is, all subranges beginning with a minimum value of 1 or more and ending with a maximum value of 10 or less, e.g., 1 to 6.7, or 3.2 to 8.1, or 5.5 to 10.

Before discussing several non-limiting embodiments of the invention, it is understood that the invention is not limited in its application to the details of the particular non-limiting embodiments shown and discussed herein since the invention is capable of other embodiments. Further, all documents, such as but not limited to issued patents and published patent applications, previously discussed, or referred to, and to be discussed or referred to, herein below are to be considered to be "incorporated by reference" in their entirety. Still further, the terminology used herein to discuss the invention is for the purpose of description and is not of limitation. In addition, unless indicated otherwise, in the following discussion like numbers refer to like elements.

Any reference to composition amounts, such as "by weight percent", "wt %" or "wt. %", "parts per million" and "ppm" are based on the total weight of the final glass composition, or the total weight of the mixed ingredients, e.g. but not limited to the glass batch materials, which ever the case may be. The "total iron" content of the glass compositions disclosed herein is expressed in terms of $Fe_2O_3$ in accordance with standard analytical practice, regardless of the form actually present. Likewise, the amount of iron in the ferrous state ($Fe^{++}$) is reported as FeO, even though it may not actually be present in the glass as FeO. The proportion of the total iron in the ferrous state is used as a measure of the redox state of the glass and is expressed as the ratio $FeO/Fe_2O_3$, which is the weight percent of iron in the ferrous state (expressed as FeO) divided by the weight percent of total iron (expressed as $Fe_2O_3$).

The visible range of the electromagnetic spectrum is 380-780 nanometers (hereinafter also referred to as "nm"), and the infra red (hereinafter also referred to as "IR") range of the electromagnetic spectrum is greater than 780 nm and usually considered to be in the range of 780-10,000 nm. As used herein, "visible transmittance" or "luminous transmittance" or "LTA" is measured using C.I.E. standard illuminant "A" with a 2° observer over the wavelength range of 380 to 770 nanometers. Glass color, in terms of dominant wavelength and excitation purity, is measured using C.I.E. standard illuminant "C" with a 2° observer, following the procedures established in ASTM E308-90; "total solar infrared transmittance" or "TSIR" is measured over the wavelength range of 775 to 2125 nanometers, and "total solar energy transmittance" or "TSET" is measured over the wavelength range of 300 to 2500 nanometers. The TSIR transmittance data is calculated using Parry Moon air mass 2.0 direct solar irradiance data and integrated using the Rectangular Rule, as is known in the art. The TSET transmittance data is calculated using ASTM air mass 1.5 global solar irradiance data and integrated using the Trapezoidal Rule, as is known in the art. Those skilled in the art will understand that the above spectral properties, e.g. LTA, infrared transmission, TSIR and TSET are measured at the actual glass thickness and can be recalculated at any thickness. In the following discussion the spectral properties of the glass are given for glasses having a standard thickness of 5.5 millimeter, even though the actual thickness of a measured glass sample is different than the standard thickness.

The present invention provides a soda-lime-silica glass that is high in visible light and infrared energy transmittance as measured in a normal (i.e. perpendicular) direction to a major surface of the glass sheet, and the glass of the invention is particularly ideal for, but is not limited to, use as cover plates for electric generating solar collectors, and glass substrates for solar mirrors. By "high visible light transmittance" is meant measured visible light transmittance equal to or greater than 85%, such as equal to or greater than 87%, such as equal to or greater than 90%, at 5.5 mm glass thickness. As is appreciated by those skilled in the art, a glass having a 90% visible light transmittance at a thickness of 5.5 mm, has a visible light transmission greater than 90% at a thickness less than 5.5 mm and has a visible light transmission less than 90% at a thickness greater than 5.5 mm. By "high infrared energy transmittance" is meant measured infrared energy transmittance equal to or greater than 85%, such as equal to or greater than 87%, such as equal to or greater than 90%, such as equal to or greater than 91%, at 5.5 mm. As is appreciated by those skilled in the art, a glass having a 91% infrared energy transmittance at a thickness of 5.5 mm, has an infrared energy transmission greater than 91% at a thickness less than 5.5 mm and has an infrared visible light transmission less than 91% at a thickness greater than 5.5 mm for glasses having a thickness less than 5.5 mm.

Figure 2:
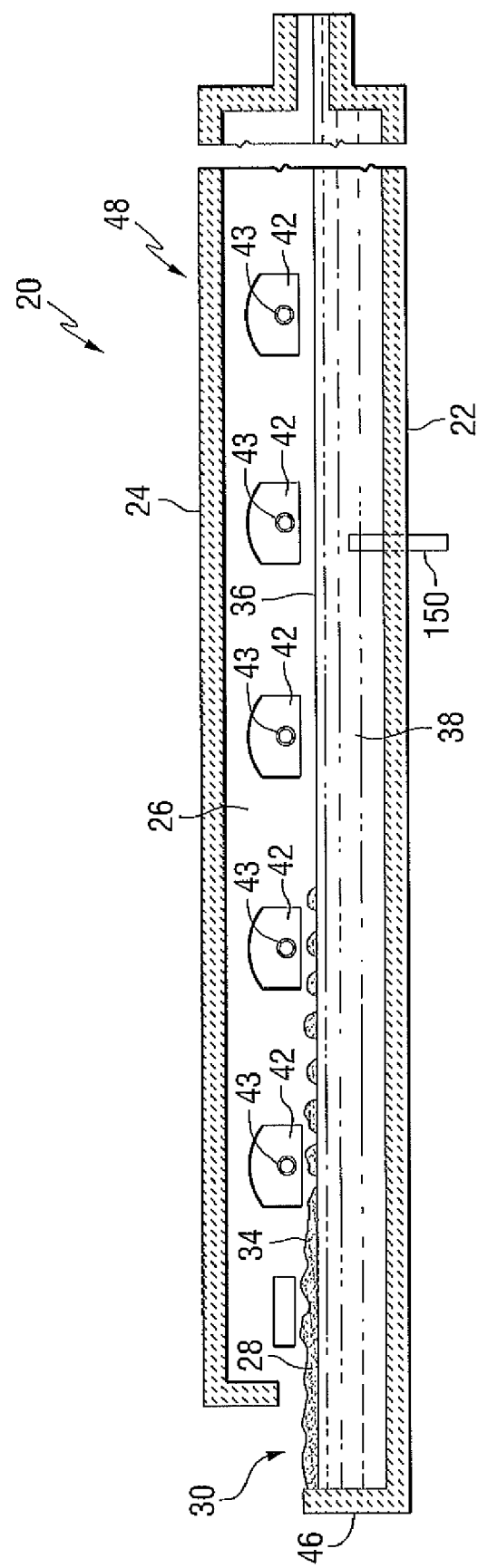
FIG. 2 is a vertical section of the melting section shown in FIG. 1A.
Figure 3:
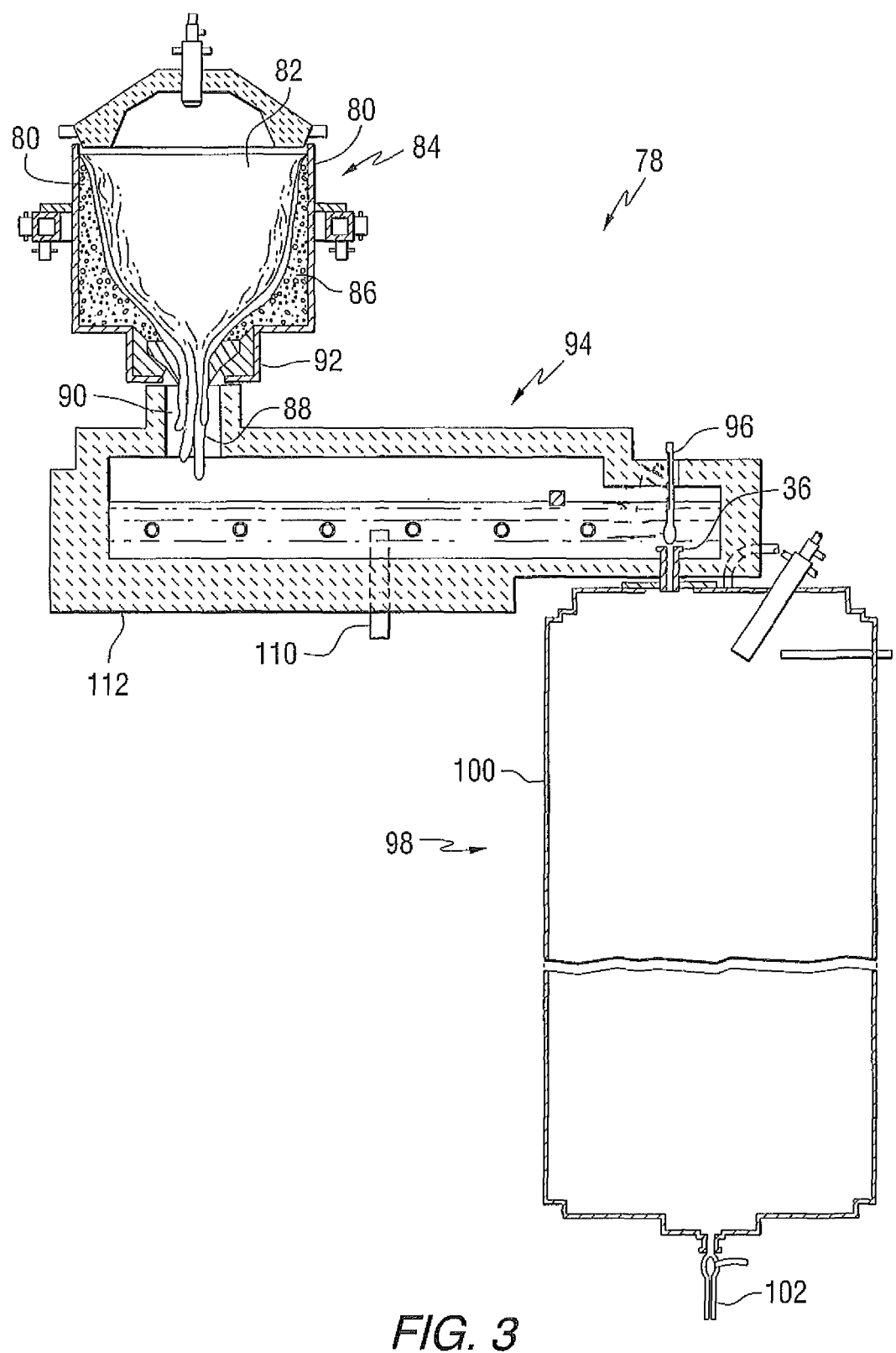
FIG. 3 is an elevated side view partially in cross section of a glass melting and refining apparatus that can be used in the practice of the invention.

The glass of the invention can be made using a conventional non-vacuum refiner float glass system, e.g. but limited to the type shown in FIGS. 1 and 2, or using a vacuum refiner float glass system, e.g. but not limited to the type shown in FIG. 3. Other types of conventional non-vacuum systems are disclosed in U.S. Pat. Nos. 4,354,866; 4,466,562 and 4,671,155, and other types of vacuum refiner float glass system are disclosed in U.S. Pat. Nos. 4,792,536 and 5,030,594.

Referring to FIGS. 1 and 2, there is shown a conventional continuously fed, cross-tank fired, glass melting and non-vacuum refining furnace 20 having an enclosure formed by a bottom 22, roof 24, and sidewalls 26 made of refractory materials. The glass batch materials 28 are introduced through inlet opening 30 in an extension 32 of the furnace 20 known as the fill doghouse in any convenient or usual manner to form a blanket 34 floating on surface 36 of molten glass 38. Overall progression of the glass as shown in FIGS. 1A and 1B is from left to right in the figures, toward entrance end of a glass forming chamber 40 of the type used in the art to make float flat glass.

Flames (not shown) to melt the batch materials 28 and to heat the molten glass 38 issue from burner ports 42 spaced along the sidewalls 26 (see FIG. 2) and are directed onto and across the surface 36 of the molten glass 38. As is known by those skilled in the art, during the first half of a heating cycle, the flames issue from a nozzle 43 (see FIG. 2) in each of the ports on one side of the tank 20, as the exhaust of the furnace moves through the ports on the opposite side of the furnace. During the second half of the heating cycle, the function of the ports are reversed, and the exhaust ports are the firing ports, and the firing ports are the exhaust ports. The firing cycle for furnaces of the type shown in FIGS. 1 and 2 are well known in the art and no further discussion is deemed necessary. As can be appreciated by those skilled in the art, the invention contemplates using a mixture of air and fuel gas, or a mixture of oxygen and fuel gas, to generate the flames to heat the batch materials and the molten glass. For a discussion of using oxygen and fuel gas in the furnace of the type shown in FIG. 1, reference can be made to U.S. patent application Ser. No. 12/031,303 filed Feb. 14, 2008 and titled "Use of Photovoltaics for Waste Heat Recovery."

The glass batch materials 28 as they move downstream from the batch feeding end or doghouse end wall 46 are melted in the melting section 48 of the furnace 20, and the molten glass 38 moves through waist 54 to refining section 56 of the furnace 20. In the refining section 56, bubbles in the molten glass 38 are removed, and the molten glass 38 is mixed or homogenized as the molten glass passes through the refining section 56. The molten glass 38 is delivered in any convenient or usual manner from the refining section 56 onto a pool of molten metal (not shown) contained in the glass-forming chamber 40. As the delivered molten glass 38 moves through the glass-forming chamber 40 on the pool of molten metal (not shown), the molten glass is sized and cooled. A dimensionally stable sized glass ribbon (not shown) moves out of the glass-forming chamber 40 into an annealing lehr (not shown). Glass making apparatus of the type shown in FIGS. 1 and 2, and of the type discussed above are well known in the art and no further discussion is deemed necessary.

Shown in FIG. 3 is continuously fed glass melting and vacuum refining equipment 78 for melting glass batch materials and refining the molten glass. Batch materials 80, preferably in a pulverulent state, are fed into cavity 82 of a liquefying vessel, e.g. a rotating drum 84. A layer 86 of the batch material 80 is retained on the interior walls of the vessel 84 aided by the rotation of the drum and serves as an insulating lining. As the batch material 80 on the surface of the lining 84 is exposed to the heat within the cavity 82, it forms a liquefied layer 88 that flows out of a central drain opening 90 at the bottom 92 of the vessel 84 to a dissolving vessel 94 to complete the dissolution of unmelted particles in the liquefied material coming from the vessel 84.

A valve 96 controls the flow of material from the dissolving vessel 94 into a generally cylindrical vertically upright vessel 98 having an interior ceramic refractory lining (not shown) shrouded in a gas-tight, water-cooled casing 100. A molten stream 102 of refined glass falls freely from the bottom of the refining vessel 98 and can be passed to a subsequent stage in the glass making process as detailed in U.S. Pat. No. 4,792,536. For a detailed discussion on the operation of the equipment 78 shown in FIG. 3 reference can be made to U.S. Pat. No. 4,792,536.

As is appreciated, the invention is not limited to the process of and/or equipment for making glass, and any of the glass making processes and/or equipment known in the art can be used in the practice of the invention.

Typically, the glass batch used in the glass making apparatus shown in FIGS. 1 and 2 includes sodium sulfate (salt cake) as a melting and refining aid in the amounts of about 5 to 15 parts by weight per 1000 parts by weight of the silica source material (sand), with about 10 parts by weight considered desirable to assure adequate refining, i.e. removal of bubbles from the molten glass. The sulfur-containing materials can be added such that the retained sulfur content e.g., the average amount of $SO_3$ left in the resultant bulk glass is less than or equal to 0.2 wt. %, such as less than or equal to 0.15 wt. %, such as less than or equal to 0.1 wt. %, such as less than or equal to 0.05 wt. %. In one non-limiting embodiment of the invention, the residual sulfur can be in the range of 0.005 wt. % to 0.13 wt. %. When operating the glass making apparatus 78 shown in FIG. 3, it is preferred, but not limiting to the invention, to restrict the sodium sulfate to less than two parts by weight per 1000 parts by weight of the silica source material and to restrict the $SO_3$ to less than 0.02 wt. %. More particularly, the glass batch materials melted in the glass making apparatus 78 shown in FIG. 3 are essentially free of sulfur. By "essentially free of sulfur" is meant that no intentional addition of sulfur-containing compounds is made to the glass batch materials. However, trace amounts of sulfur can be present in the glass due to impurities in the batch materials or other sources, e.g. but not limited to cullet. By "trace amounts of sulfur" is meant sulfur in the range of greater than 0 wt. % to 0.03 wt. %. The "sulfur" content of the glass compositions disclosed herein is expressed in terms of $SO_3$ in accordance with standard analytical practice, regardless of the form actually present.

Glass batch materials used for making low iron glass cover plates for electric power generating solar collectors, and for making glass substrates for solar mirrors preferably provide a glass that has a high measured transmission, e.g. greater than 90%, and a high measured IR transmission, e.g. greater than 91%. In the practice of the invention, iron is not intentionally added to the batch materials, and iron present in the molten glass as ferrous iron ($Fe^{++}$) is oxidized to ferric iron ($Fe^{+++}$). As is appreciated by those skilled in the art and as discussed above, additions of $CeO_2$ are added to the glass batch materials to oxidize the ferrous ion ($Fe^{++}$) to the ferric ion ($Fe^{+++}$) to increase the visible and IR transmission of the glass. It is believed, however, that exposing glass having $CeO_2$ to the sun's radiation results in solarization reactions which photo-oxidizes $Ce^{+++}$ to $Ce^{++++}$ and photo-reduces $Fe^{+++}$ to $Fe^{++}$, which results in the reduction of visible and IR transmission of the glass. $CeO_2$ in amounts less than 0.0025 wt. % (25 ppm) or less in the glass does not result in objectionable levels of solarization, e.g. a reduction of less than 0.15% of the measured visible and IR transmission after exposure to sunlight for 28 days. $CeO_2$ in amounts equal to, or greater than 0.0800 wt. % (800 ppm) results in unacceptable levels of solarization, e.g. a 1.0% reduction in the measured visible and IR transmission of the glass after exposure to sunlight for 28 days.

In view of the forgoing, in the preferred practice of the invention ingredients that oxidize the ferrous iron $Fe^{++}$ to the ferric $Fe^{+++}$, and can be solarized, e.g. $CeO_2$ are not added to the batch materials, and if present, are present as tramp materials, such that the glass preferably has equal to or less than 0.0025 wt. % (25 ppm) $CeO_2$. Although the invention is directed to low iron soda-lime-silica glasses, e.g. soda-lime-silica glasses having equal to or less than 0.01 wt. % (100 ppm) total iron expressed as $Fe_2O_3$, the invention is not limited thereto, and the invention can be practiced to lower the percent by weight of the ferrous iron in high iron glasses, e.g. soda-lime-silica glasses having greater than 0.01 wt. % (100 ppm) total iron expressed as $Fe_2O_3$. Further, the invention is not limited to glass cover plates for solar collectors, and to glass substrates for solar mirrors, and can be used (1) as a glass cover plate, or glass substrate for any type of solar cell or solar collector; (2) as residential and commercial windows; (3) as windows for any type of vehicle, e.g. land, air, space, above water, and below water, vehicle; (4) as furniture table tops, and (5) combinations thereof.

Table 1 lists the major constituents and their respective ranges in weight percent of a non-limiting embodiment of a commercial clear float glass of the invention that can be used to make cover plates for solar collectors, glass substrates for solar mirrors, and/or commercial, residential and appliance windows.

TABLE 1

| CONSTITUENT | WEIGHT % |
|---|---|
| $SiO_2$ | 65-75 |
| $Na_2O$ | 10-20 |
| CaO | 5-15 |
| MgO | 0-5 |
| $Al_2O$ | 0-5 |
| $K_2O$ | 0-5 |
| SO3 | 0-0.30 |

TABLE 1-continued

| CONSTITUENT | WEIGHT % |
|---|---|
| Total iron as $Fe_2O_3$ | greater than 0-0.120 |
| Redox ratio | less than 0.350 |

Usually cerium is added to the batch materials as hydrated cerium carbonate ($Ce_2CO_3.3H_2O$) and can be present in the glass as $Ce^{+++}$ ($Ce_2O_3$) or $Ce^{++++}$ ($CeO_2$). In one non-limiting embodiment of the invention, no $CeO_2$ is present in the glass. In another non-limiting embodiment of the invention $CeO_2$ is present in the glass in amounts equal to or less than 0.0025 wt. %. In still another non-limiting embodiment of the invention, $CeO_2$ can be present in the glass as a tramp material, e.g. as an impurity in the batch materials and/or in the glass cullet added to the batch materials to aid in the melting of the batch materials. Based on the forgoing $CeO_2$ can be present in the glass of the invention within the range of 0 to 0.0100 wt. %, preferably in the range of 0 to 0.0075 wt. %, more preferably in the range of 0 to 0.0050 wt. %, and most preferably in the range of 0 to 0.0025 wt. %.

Clear soda-lime-silica glasses having low amounts of iron have a substantial absence of color in visible transmittance. In the practice of one non-limiting embodiment of the invention, the total iron expressed as $Fe_2O_3$, is less than about 0.025 wt. % (250 parts per million), more preferably less than 0.015 wt. % (150 parts per million) and most preferably less than 0.010 wt. % (100 parts per million), and in the preferred practice of the invention the glasses have a redox value (FeO/$Fe_2O_3$) of less than 0.35, preferably less than 0.25, more preferably less than 0.20, and most preferably less than 0.150.

Examples of commercial low iron glass that have high measured visible and IR transmission are presented in Table 2 below.

TABLE 2

| CONSTITUENT | (A) WEIGHT % | (B) WEIGHT % |
|---|---|---|
| $SiO_2$ | 65-75 | 65-75 |
| $Na_2O$ | 10-20 | 10-20 |
| CaO | 5-15 | 5-15 |
| MgO | 0-5 | 0-5 |
| $Al_2O_3$ | 0-5 | 0-5 |
| $K_2O$ | 0-5 | 0-5 |
| $SO_3$ | 0.12-0.20 | 0.12-0.20 |
| Total iron as $Fe_2O_3$ | 0.005-0.025 | 0.005-0.025 |
| Redox ratio | less than 0.250 | less than 0.550 |
| $CeO_2$ | 0.18-0.256 | 0.02-0.100 |

The glasses of Table 2 can be made using the equipment shown in FIGS. 1-3; it should be noted however, that if the equipment shown in FIG. 3 is used, the $SO_3$ is preferably less than 0.02 wt %.

In the practice of the invention, oxygen is introduced into the molten glass to oxidize the ferrous iron ($Fe^{++}$) to the ferric iron ($Fe^{+++}$). In one non-limiting embodiment of the invention, oxygen is bubbled into the pool of molten glass; in another non-limiting embodiment of the invention, the ratio of oxygen to fuel or firing gas is increased to oxidize the iron in the ferrous state ($Fe^{++}$) to iron in the ferric state ($Fe^{+++}$), and in still another non-limiting embodiment of the invention, oxygen is bubbled into the pool of molten glass and the ratio of oxygen to fuel or firing gas is increased to oxidize the iron in the ferrous state ($Fe^{++}$) to iron in the ferric state ($Fe^{+++}$). Support for one non-limiting embodiment of the invention that oxygen can be used to oxidize the iron in the ferrous state to iron in the ferric state, and for another non-limiting embodiment of the invention that oxygen can be used to replace all or part of the $CeO_2$ to oxidize the iron in the ferrous state to iron in the ferric state, is provided by the following experiment.

Six lab melts were made of low iron glass of the type sold by PPG Industries, Inc. under the registered trademark Starphire. Each of the lab melts included 1000 grams of Starphire glass cullet. The glass composition of the cullet was not analyzed; however, the Starphire glass has a glass composition within the ranges of the ingredients shown in column (B) of Table 2. The cullet was contained in 4-inch silica crucibles and melted at a temperature of 2600 degrees F. (1427 degrees C.). Oxygen gas was introduced into the molten glass using a porous ceramic tube made by etching the bottom 1 inch (2.54 centimeters) of the closed end of a mullite tube in hydrofluoric acid. Although the sizes of the holes were not measured, it is believed the holes had a diameter of about less than 1 millimeter.

Sample A was the control sample and no oxygen was introduced into the molten glass of Sample A. The flow rate of oxygen introduced into the molten glass of Sample B was 10 cubic centimeters ("CC") per minute for 30 minutes; into the molten glass of Sample C was 20 CC per minute for 30 minutes; into the molten glass of each of Samples D and E was 20 CC per minute for 60 minutes, and into the molten glass of Sample F was 20 CC per minute for 120 minutes. Upon conclusion of the introduction of oxygen of the molten glass of the Samples B-F, it was observed that the ends of the tubes in the molten glass of Samples C and D were broken. It is believed that the tubes broke as a result of thermal shock. The molten glass of each of the crucibles of Samples A-F was cooled, and the glass analyzed to determine the redox ratio of Sample A (the control sample) and the redox ratio of the Samples B-F (the "test samples"). The FeO, $Fe_2O_3$ and FeO/$Fe_2O_3$ (the redox ratio) of the Samples A-F are shown in Table 3 below.

TABLE 3

| COMPONENT | SAMPLE | | | | | |
|---|---|---|---|---|---|---|
| | A | B | C | D | E | F |
| FeO | 0.0044 | 0.0038 | 0.0022 | 0.0043 | 0.0002 | 0.0000 |
| $Fe_2O_3$ | 0.0154 | 0.0162 | 0.0172 | 0.0179 | 0.0172 | 0.0176 |
| FeO/$Fe_2O$ | 0.286 | 0.235 | 0.128 | 0.240 | 0.012 | 0.000 |

The Samples B-F each had a lower redox value than the redox value of Sample A indicating that more of the ferrous iron in Samples B-F was oxidized than in the Sample A. Based on the amount of oxygen added to the molten glass for sample F and sample C, the efficiency for below Reaction 1 ranged from 0.16 to 0.35%. The efficiency was determined by calculating the amount of oxygen that reacted with the ferrous iron divided by the total amount of oxygen introduced into the molten glass during the lab experiment through the porous ceramic tube.

$$4FeO + O_2 \leftrightarrow 2Fe_2O_3 \quad \text{Reaction 1}$$

As is appreciated by those skilled in the art, the above lab experiment clearly demonstrates that moving oxygen through molten glass oxidizes the ferrous iron to the ferric iron and lowers the redox ratio.

In the practice of one non-limited embodiment of the invention, the glass batch ingredients selected for making low iron glasses have no additions of iron, and any iron present in the batch materials is present as tramp materials. Iron content generally referred to as tramp amounts of iron are amounts of iron less than 0.025 wt. %. For purposes of the present invention, batch materials are selected to have an iron content to provide the glass with a total iron expressed as $Fe_2O_3$ of less than 0.025 wt. % (250 ppm). As is appreciated by those skilled in the art, batch materials are selected for minimal iron contamination, but it would be difficult to reduce the total iron content ($Fe_2O_3$) in the glass batch materials to provide a glass having less than about 0.005 wt. % (50 ppm) without incurring considerable expense. In the non-limiting embodiment of the invention under discussion, batch selection includes a low iron sand, which can have an iron content of about 0.008 wt. % iron (80 ppm) analyzed as $Fe_2O_3$. Limestone and dolomite, conventional glass batch materials, are avoided because of their typical iron contamination. Instead, it is preferred to use a purer source of calcium such as aragonite, which is a mineral form of calcium carbonate with only about 0.020 wt. % (200 ppm) $Fe_2O_3$. Further it is preferred to use low iron dolomite, having an iron ($Fe_2O_3$) content of less than about 0.020 wt. % (200 ppm). A preferred alumina source is aluminum hydrate, with about 0.008 wt. % (80 ppm) $Fe_2O_3$. An example of a glass batch mixture that can be used to make glasses within the ranges of the glass of Table 1 is shown in Table 4.

TABLE 4

| Batch Constituent | Parts by Weight |
|---|---|
| Low Iron Sand | 1000 |
| Soda Ash | 322-347.8 |
| Aragonite | 160-281 |
| Dolomite | 0-179 |
| Aluminum hydrate | 0-35.1 |
| Salt Cake | 0-15 |

As discussed above, in the preferred practice of the invention, cerium is not added to the batch materials, and preferably, but not limiting to the invention, cerium is only present as a tramp material, e.g. less than 0.010 wt. % (100 ppm).

The batch materials for the glass making processes shown in FIGS. 1-3 preferably include the ingredients in the range shown on Table 4, except that the glass making apparatus shown in FIG. 3 is preferably operated using two parts by weight of sodium sulfate per 1000 parts by weight of the sand (the silica source material); whereas, it is preferred to operate the glass making apparatus of FIGS. 1 and 2 using 7 parts by weight of sodium sulfate per 1000 parts by weight of the silica source material. In the practice of the invention, the glass batch materials of Table 4 provide glasses having compositions shown in Table 5 below.

TABLE 5

| Ingredient | (A) wt. % | (B) wt. % | (C) wt. % |
|---|---|---|---|
| $SiO_2$ | 72.65 | 73.26 | 72.85 |
| $Na_2O$ | 13.87 | 15.09 | 14.04 |
| CaO | 10.20 | 11.03 | 9.64 |
| MgO | 2.94 | 0.17 | 3.14 |
| $SO_3$ | 0.173 | 0.196 | 0.169 |
| $Fe_2O_3$ | 0.0086 | 0.0087 | 0.0176 |
| $Al_2O_3$ | 0.04 | 0.04 | 0.04 |
| SrO | 0.126 | 0.206 | 0.108 |

The glass compositions of Table 5 were computer calculated from the batch formula of Table 4. It should be noted, however, that the glass composition of the fifth experiment discussed below was selected to be similar to computer calculated glass composition of Column (A) of Table 5. The computer program does not provide a redox ratio; however, the redox ratios of the invention discussed above are applicable for the glass compositions shown in Table 5. The glasses listed in Table 5 made using the glass making apparatus of FIG. 3 would have an $SO_3$ content less than 0.02 wt. %. As can be appreciated, the invention is not limited to the glass compositions listed in Table 5.

Other ingredients having a wt. % less than 0.01 wt. % are tramp materials which are impurities found in the batch materials and can include $MnO_2$, $ZrO_2$, CoO, Se, NiO, Cl, $P_2O_5$, $V_2O_5$, $CeO_2$, $Cr_2O_3$, $Li_2O$, $K_2O$ and $TiO_2$.

The following experiments were conducted on a glass production line having a furnace of the type shown in FIGS. 1 and 2 to determine the effect of exposing molten glass 38 to controlled amounts of $O_2$ prior to the molten glass 38 moving through the waist 54 of the furnace 20. In one experiment two oxygen spargers each consisting of a 2 inch (5.08 centimeter ("cm")) diameter, 6 inch (15.2 cm) long porous $Al_2O_3$—$ZrO_2$—$SiO_2$ refractory (tradename Vision commercially available from ANH Refractories Co.) cylindrical block attached to the end of a 1 inch (2.54 centimeter) diameter and 16 feet (4.9 meters) long water cooled straight metal pipe were located 3 feet (0.9 meters) from the batch feeding end 46 of the melter 48 and 4 feet (1.2 meters) from the left wall of the furnace, and the second sparger was located 3 feet (0.9 meters) from the batch feeding end of the melter and 4 feet (1.2 meters) from the right wall of the furnace. Each of the spargers was spaced 42 inches (1.1 meters) above the bottom surface of the furnace. Twenty five (25) cubic feet per hour ("CFH") of oxygen were moved through each of the spargers. It was observed that the spargers generated gas bubbles that were about ⅛ inch (0.32 centimeter) in diameter as they burst on the surface of the molten glass.

The batch composition had ingredients to make glass similar to the glass listed in column B of Table 5. The batch ingredients initially added to the melter did not have any additions of $CeO_2$, the only $CeO_2$ present in the batch materials were tramp amounts, and the $CeO_2$ present in the glass cullet. Twice during the glass production run hydrated cerium carbonate was added to the batch materials. A first sample of the glass was taken before the first addition of the hydrated cerium carbonate and was analyzed; the first sample had a redox ratio of 0.48. Three (3) pounds of hydrated cerium carbonate per 1000 pounds of sand was added to the batch materials for 12 hours. Forty eight (48) hours after the first addition of hydrated cerium carbonate, a second sample of the glass was taken and analyzed; the second sample had a redox ratio of 0.43. The $CeO_2$ in the glass increased from 0.04 wt. % to 0.06 wt. %. After a period of 6 days after the first addition, a second addition of hydrated cerium carbonate was made. The second addition was 3 pounds of hydrated cerium carbonate per 1000 pounds of sand for 26 hours. Four (4) days after the second addition, a third sample of the glass was taken and analyzed. The third sample of glass had a redox ratio of 0.471; contained 0.0102 wt % (102 ppm) $Fe_2O_3$, and 0.04 wt % (400 ppm) $CeO_2$. The usual level of $CeO_2$ is about 0.07% (700 ppm) and the usual level of the redox ratio is in the range of about 0.48-0.50. The results from the first experiment suggested that the introduction of oxygen gas into the molten glass through the two porous refractory spargers can serve as a substitute for adding $CeO_2$ to oxidize the ferrous iron to the ferric iron, and to lower the glass redox ratio by about 0.01-0.03, in a large commercial glass furnace.

A second experiment was conducted on a glass production run to make clear glass having 0.10 wt % $Fe_2O_3$, i.e. high iron glass. In the second experiment, the sparger positions in relationship to the furnace walls was the same, however the spargers were spaced 8 inches (20 cm) from the bottom surface of the furnace. Further, each of the the spargers in the second experiment was a thicker porous refractory cylindrical block (3 inch (7.6 cm) diameter compared to only 2 inch (5.08 cm) diameter used in the first experiment) to increase the useable life of the spargers. The oxygen flow rate was 20 CFH at 40 PSI through each of the spargers. The average redox ratio of the glass two weeks before oxygen was flowed through the spargers was 0.338 and the range of the redox ratio was 0.005. The average redox ratio with oxygen moving through the spargers was 0.336 and the range of the redox ratio was 0.01. There was no significant change in the mean value of redox ratio, only an increase in the variability of the redox value. The conclusion of the second experiment was that while the glass redox ratio was lowered at least part of the time while using the oxygen spargers, the glass redox ratio was not lowered on a continuous basis due to non-homogeneous mixing of the molten glass in the furnace.

In a third experiment, the production run was making a glass composition included 0.05 wt % $CeO_2$. In the third experiment, oxygen was moved through selected bubblers of one row of 19 individual gas bubblers (water cooled metal tubes) 150 (see FIG. 1A) mounted in the base 26 of the furnace 20. The bubblers extended upward into the molten glass about 24 inches (0.61 meters) from the bottom surface of the furnace and 33 inches (0.84 meters) below the surface 36 of the molten glass 38. The bubblers 150 were positioned about 50 feet from the wall 46 of the furnace 20 in the area of the $4^{th}$ port 42 (see FIG. 2). The bubblers 150 were spaced about 18 inches (0.46 meters) apart and span the furnace 20 in a perpendicular fashion to the direction of the molten glass flow. Initially oxygen was moved through 6 bubblers, and then over the next three days through 12 of the remaining 13 bubblers; one bubbler did not function because it was clogged. Although the position of the first six bubblers was not recorded, it is believed the six bubblers were the three outer bubbles on each end of the row of bubblers. The oxygen flow was initially 5 CFH through each of the 18 bubblers and was increased after 3 days by 5 CFH, and increased by 5 CFH once again 4 days after the first increase. The last step of 5 CFH was reversed because the high rate of oxygen bubbling was entraining and leaving residual bubbles in the molten glass. It was observed that the bubblers generated gas bubbles that were about 6 inches (15.2 cm) in diameter as they burst on the surface of the molten glass. The glass redox ratio prior to introducing oxygen gas through the bubblers was 0.45. The glass made with oxygen moving through the 18 bubblers and after the last step of 5 CFH was reversed had a redox ratio of 0.41 and an $Fe_2O_3$ of 0.0096 wt. %. The use of the oxygen gas in the bubblers lowered the glass redox by 0.04.

A fourth experiment was conducted on the glass composition of the third experiment except that the only $CeO_2$ present in the batch materials was tramp $CeO_2$ in the glass cullet in an amount of 0.04 wt. %. In the fourth experiment, the bubblers were raised to a position 27 inches (0.69 meters) from the level of the molten glass and the oxygen was moved through each of the 18 bubblers 150 at a flow rate of 12.5 CFH. The oxygen gas flow rate was increased from 12.5 CFH to 17.5 CFH per bubbler, and from 17.5 CFH to 20 CFH per bubbler over the next five days. The rate of oxygen was dropped back to 17.5 CFH because the high rate of oxygen gas bubbling was entraining and leaving residual bubbles in the molten glass. A sample of the glass while bubbling oxygen gas at a flow rate of 17.5 CFH per bubbler had a redox ratio of 0.467, 0.0092 wt. % (92 ppm) $Fe_2O_3$ and 0.033 wt. % $CeO_2$ (330 ppm). It is believed that bubbling oxygen gas at a total flow rate of 100

CFH into 7564 cubic feet of molten glass for 24 hours (2400 CF of oxygen per 7564 cubic feet of molten glass) is equal to about 0.01 wt. % $CeO_2$ in terms of causing an equivalent decrease in the glass redox ratio. The efficiency of bubbling with oxygen gas in the commercial glass furnace was calculated and is about 0.12%, which is similar to that observed in the laboratory experiment. The efficiency was determined by calculating the amount of oxygen that reacted with the ferrous iron divided by the total amount of oxygen introduced into the molten glass during the fourth experiment through the 18 bubblers 150.

From the above experiments it was concluded that the glass redox ratio can be lowered by introducing oxygen gas into the molten glass as a substitute for the need to add $CeO_2$ to oxidize the iron in the ferrous state ($Fe^{++}$) to iron in the ferric state ($Fe^{+++}$). The oxygen gas can be introduced through either a sparger consisting of a porous refractory block or a water cooled metal bubblers. It was observed that the size of the bubbles generated by the oxygen gas was much smaller using the sparger than with the water cooled bubbler More particularly, the size of the bubbles from the spargers were similar to the bubbles moved through the molten glass in the lab experiment. In the instance when the glass is made in the glass making apparatus shown in FIG. 3, the oxygen would be bubbled into the molten glass in the dissolution chamber 94 through bubblers 110 (only one shown in FIG. 3) mounted through the base 112 of the dissolution chamber 94.

With reference to FIG. 2, in another non-limiting embodiment of the invention, oxygen to oxidize the ferrous iron ($Fe^{++}$) to ferric iron ($Fe^{+++}$) is provided by increasing the ratio of combustion air, i.e. oxygen gas to the fuel or firing gas at the firing ports. The normal firing ratio of combustion air to fuel gas is 10.9 as determined by the formula "total combustion air flow rate (the combustion air to all of the firing ports) divided by total fuel gas flow rate (fuel gas to all of the firing ports)." As is appreciated by those skilled in the art, the flow rate of combustion air and fuel gas is not evenly distributed to each of the firing ports; however, in the practice of the invention the total flow rate of the combustion air and the total flow rate of the fuel gas is of interest. Further, as is appreciated by those skilled in the art, the combustion gas includes 21% oxygen and the remaining percent mostly nitrogen. Therefore, the normal firing ratio of oxygen to fuel gas for combustion air/fuel gas fired furnaces is 2.29 (10.9 total combustion air/total fuel gas×0.21 oxygen in combustion air). In the following discussion, the "air firing ratio" is determined by the formula "total combustion air flow rate (the combustion air to all of the firing ports) divided by total fuel gas flow rate (fuel gas to all of the firing ports)" and is normally 10.9. The "oxygen firing ratio" for an oxygen/fuel gas fired furnace is determined by the formula "total oxygen gas flow rate (the oxygen to all of the firing ports) divided by total fuel gas flow rate (fuel gas to all of the firing ports)" and is normally 2.29, and the "oxygen firing ratio" for a combustion air/fuel gas firing furnace is determined by the formula "total combustion air flow rate times percent of oxygen in the combustion air divided by total fuel gas flow rate (fuel gas to all of the firing ports)" and is normally 2.29. Increasing the air firing ratio to greater than 11.0, or the oxygen firing ratio to 2.31 by increasing the total combustion air flow rate or the total combustion oxygen, respectively, provides excess oxygen to oxidize the ferrous iron ($Fe^{++}$) to ferric iron ($Fe^{+++}$).

In a fifth experiment that was conducted on a commercial glass furnace making low iron glass having a glass composition similar to the computer calculated glass composition of column A in Table 5. A sample of glass was taken and analyzed; the glass had a redox ratio of 0.45. During the fifth experiment, oxygen gas at a flow rate of 3 CFH per bubbler was moved through the 18 bubblers 150 located in Port 4 of the glass furnace 20. The batch materials were changed by using low iron dolomite to replace part of the aragonite in the glass batch. The dolomite increases the MgO content of the glass, which increases the durability of the glass as is known in the art. It is believed that the addition of dolomite also helps to lower the glass redox, because the dolomite does not contain high levels of carbon impurities, which are present in the aragonite and can act as a reducing agent to reduce the ferric iron ($Fe^{+++}$) to the ferrous iron ($Fe^{++}$).

Combustion air at each of the 7 ports 42 on each side of the furnace 20 was increased during their firing cycle by increasing the air firing ratio from 12.3 to 13.3 in steps of 0.1-0.4 (increasing the oxygen firing ratio from 2.58 to 2.79 in steps of 0.02-0.084) each over a five day period. About 72 hours after the ratio was increased, a sample of glass was taken and analyzed. The redox ratio of the sample was 0.39. The low iron float glass composition produced is similar to the computer generated glass composition of Column (A) in Table 5 and contained 0.0084 wt. % (84 ppm) $Fe_2O_3$ and 0.0021 wt. % (21 ppm) $CeO_2$. The glass had a LTA (visible transmittance value) of 91.3%, a TSIR value of 90.4% and a TSET value of 90.7% at an actual thickness of about 3.2 mm (0.1254 inches). An LTA value of 91.3% is a very high glass transmittance that is useful as a cover plate to protect the photovoltaic cells in electric power generating solar collectors and as a glass substrate for solar mirrors. It is concluded from this fifth experiment that the glass redox ratio can be lowered by about 0.06 by increasing the air firing ratio (the oxygen firing ratio).

As is appreciated by those skilled in the art, increasing the oxygen firing ratio and operating the furnace at elevated temperatures can increase NOx emissions. This can be managed by reducing the temperature of the furnace and/or by appropriate emission control equipment. The invention is not limited to operating temperature of the furnace and/or by the use of emission control systems.

From the above it can be appreciated that increasing the air firing ratio (the oxygen firing ratio) provides oxygen to the molten glass to oxidize the ferrous iron ($Fe^{++}$) to ferric iron ($Fe^{+++}$). As can be appreciated, the invention is not limited to any particular ratio value; however, it is preferred to have an oxygen firing ratio of 2.31 (an air firing ratio of 11.0), more preferred an oxygen firing ratio of 2.63 (an air firing ratio of 12.5), and most preferred an oxygen firing ratio of 2.71 (an air firing ratio of 12.9). Further as can be appreciated, bubbling oxygen through the molten glass provides oxygen to the molten glass to oxidize the ferrous iron ($Fe^{++}$) to ferric iron ($Fe^{+++}$). In one non-limiting embodiment of the invention, and as discussed above, 2400 CF per 24 hours of oxygen per 7564 cubic feet of molten glass (0.32 CF per 24 hours per cubic foot of molten glass) is equal to about 0.01% $CeO_2$ in terms of causing an equivalent decrease in the glass redox ratio. Still further, as can be appreciated, increasing the air firing ratio (the oxygen firing ratio) while bubbling oxygen through the molten glass increases the amount of oxygen to the molten glass to oxidize the ferrous iron ($Fe^{++}$) to ferric iron ($Fe^{+++}$) and can be used to avoid excessive increases of the air firing ratio (the oxygen firing ratio) thereby reducing environmental concerns.

Based on the forgoing, the invention can be practiced to make a glass for solar control cover plates and for solar mirrors, e.g. low iron glass having the components in the range shown in Table 6, and the properties discussed below.

TABLE 6

| COMPONENT | RANGE |
|---|---|
| $SiO_2$ | 65-75 wt. % |
| $Na_2O$ | 10-20 wt. % |
| CaO | 5-15 wt. % |
| MgO | greater than 0 to 5 wt. % |
| $CeO_2$ | less than 0.0025 wt. % |
| $SO_3$ | 0.12-0.2 wt. % |
| $Fe_2O_3$ (total iron) | equal to or less than 0.01 wt. % |
| Redox ratio | less than 0.400, or less than 0.350, or less than 0.200, or less than 0.150 |

The glasses of Table 6 at a glass thickness of 5.5 millimeters have an LTA equal to or greater than 85%, or equal to or greater than 87%, or equal to or greater than 90%; a TSIR equal to or greater than 85%, or equal to or greater than 87%, or equal to or greater than 90%, or equal to or greater than 91%, and a TSET equal to or greater than 89%, or equal to or greater than 90%, or equal to or greater than 91%. The spectral properties of the glass vary as the redox ratio and/or the $Fe_2O_3$ (total iron) vary as was discussed above.

Further, based on the forgoing, the invention can be practiced to make a glass for commercial and residential buildings, furniture and appliances, and for land, above and below water, and aerospace, e.g. high iron glass having the components in the range shown in Table 7, and the properties discussed below.

TABLE 7

| COMPONENT | RANGE |
|---|---|
| $SiO_2$ | 65-75 wt. % |
| $Na_2O$ | 10-20 wt. % |
| CaO | 5-15 wt. % |
| MgO | greater than 0 to 5 wt. % |
| $CeO_2$ | less than 0.080 wt. %, or less than 0.060 wt. %, or less than 0.030 wt. % or less than 0.020 wt. %, or less than 0.010 wt. % |
| $SO_3$ | 0.12-0.2 wt. % |
| $Fe_2O_3$ (total iron) | greater than 0.01 wt. % to 0.12 wt. % |
| Redox ratio | less than 0.550, or less than 0.400, or less than 0.350, or less than 0.200, or less than 0.150 |

The glasses of Table 7 at a glass thickness of 5.5 millimeters, have an LTA equal to or greater than 85%, or equal to or greater than 87%, or equal to or greater than 90%; a TSIR equal to or greater than 85%, or equal to or greater than 87%, or equal to or greater than 89%, or equal to or greater than 90%, and a TSET equal to or greater than 88%, or equal to or greater than 89%, or equal to or greater than 90%. The spectral properties of the glass vary as the redox ratio and/or the $Fe_2O_3$ (total iron) vary as was discussed above.

The above glasses are preferably, but not limited to the invention, made in glass making equipment similar to, but not limited to the type shown in FIGS. 1 and 2. The above glass can be made in glass making equipment having a vacuum refiner, e.g. similar to, but not limited to the type shown in FIG. 3 by reducing the $SO_3$ to less than 0.010 wt % as discussed above.

It will be readily appreciated by those skilled in the art that modifications can be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A soda-lime-silica glass, comprising:

| | | |
|---|---|---|
| $SiO_2$ | 65-75 | weight percent |
| $Na_2O$ | 10-20 | weight percent |
| CaO | 5-15 | weight percent |
| MgO | 0-5 | weight percent |
| $Al_2O_3$ | 0-5 | weight percent |
| $K_2O$ | 0-5 | weight percent |
| $SO_3$ | 0-0.30 | weight percent | and a colorant portion consisting essentially of:

| | |
|---|---|
| Total iron as $Fe_2O_3$ | 0.005-0.120 weight percent |
| Redox ratio | in the range of 0.15-0.286 |
| $CeO_2$ | less than 0.0025 weight percent |
| $ZrO_2$ | less than 0.01 weight percent and |
| $TiO_2$ | less than 0.01 weight percent, and | wherein spectral properties of the glass measured at a thickness 5.5 millimeters comprises:

a visible transmission of greater than 85% measured using C.I.E. standard illuminant "A" with a 2° observer over a wavelength range of 380 to 770 nanometers;

a total solar infrared transmittance of greater than 87% measured over a wavelength range of 775 to 2125 nanometers, and a total solar energy transmittance of greater than 90% measured over a wavelength range of 300 to 2500 nanometers, wherein the total solar infrared transmittance and the total solar energy transmittance are calculated using Parry Moon air mass 2.0 direct solar irradiance data and ASTM air mass 1.5 global solar irradiance data respectively, and integrated using the Rectangular Rule and Trapezoidal Rule, respectively.

2. The glass according to claim 1 wherein the spectral properties comprise:

the visible transmission is greater than 87%, and the total solar infrared transmittance of greater than 89%.

3. The glass according to claim 1 wherein the spectral properties comprise:

the visible transmission is greater than 90%, and the total solar infrared transmittance of greater than 90%.

4. The glass according to claim 1 wherein weight percent of ingredients that oxidize $Fe^{++}$ to $Fe^{+++}$ other than those listed in claim 1 is less than 0.0025 weight percent.

5. The glass according to claim wherein the redox ratio is in the range of 0.15-0.27.

6. The glass according to claim 1 wherein the redox ratio is in the range of 0.15-0.19.

7. A soda-lime-silica glass, comprising:

| | | |
|---|---|---|
| $SiO_2$ | 65-75 | weight percent |
| $Na_2O$ | 10-20 | weight percent |
| CaO | 5-15 | weight percent |
| MgO | 0-5 | weight percent |
| $Al_2O_3$ | 0-5 | weight percent |
| $K_2O$ | 0-5 | weight percent |
| $SO_3$ | 0-0.30 | weight percent | and a colorant portion consisting essentially of:

| | |
|---|---|
| Total iron as $Fe_2O_3$ | 0.005-0.025 weight percent, |
| Redox ratio | less than 0.350, |
| $CeO_2$ | less than 0.0025 weight percent, |
| $ZrO_2$ | less than 0.01 weight percent and |
| $TiO_2$ | less than 0.01 weight percent, and | wherein spectral properties of the glass measured at a thickness 5.5 millimeters comprises:
   a visible transmission of greater than 90% measured using C.I.E. standard illuminant "A" with a 2° observer over a wavelength range of 380 to 770 nanometers;
   a total solar infrared transmittance of greater than 90% measured over a wavelength range of 775 to 2125 nanometers, and
   a total solar energy transmittance of greater than 90% measured over a wavelength range Of 300 to 2500 nanometers, wherein the total solar infrared transmittance and the total solar energy transmittance are calculated using Parry Moon air mass 2.0 direct solar irradiance data and ASTM air mass 1.5 global solar irradiance data respectively, and integrated using the Rectangular Rule and Trapezoidal Rule, respectively.

8. A soda-lime-silica glass, comprising:

| | |
|---|---|
| $SiO_2$ | 65-75 weight percent |
| $Na_2O$ | 10-20 weight percent |
| CaO | 5-15 weight percent |
| MgO | 0-5 weight percent |
| $Al_2O_3$ | 0-5 weight percent |
| $K_2O$ | 0-5 weight percent |
| $SO_3$ | 0-0.30 weight percent | and a colorant portion consisting essentially of:

| | |
|---|---|
| Total iron as Fe2O3 | 0.005-0.025 weight percent |
| Redox ratio | less than 0.200 |
| $CeO_2$ | less than 0.0025 weight percent |
| $ZrO_2$ | less than 0.01 weight percent and |
| $TiO_2$ | less than 0.01 weight percent, and | wherein spectral properties of the glass measured at a thickness 5.5 millimeters comprises:
   a visible transmission of greater than 85% measured using C.I.E. standard illuminant "A" with a 2° observer over a wavelength range of 380 to 770 nanometers;
   a total solar infrared transmittance of greater than 87% measured over a wavelength range of 775 to 2125 nanometers, and
   a total solar energy transmittance of greater than 90% measured over a wavelength range of 300 to 2500 nanometers, wherein the total solar infrared transmittance and the total solar energy transmittance are calculated using Parry Moon air mass 2.0 direct solar irradiance data and ASTM air mass 1.5 global solar irradiance data respectively, and integrated using the Rectangular Rule and Trapezoidal Rule, respectively.

9. A soda-lime-silica glass, comprising:

| | |
|---|---|
| $SiO_2$ | 65-75 weight percent |
| $Na_2O$ | 10-20 weight percent |
| CaO | 5-15 weight percent |
| MgO | 0-5 weight percent |
| $Al_2O_3$ | 0-5 weight percent |
| $K_2O$ | 0-5 weight percent |
| $SO_3$ | 0-0.30 weight percent | and a colorant portion consisting essentially of:

| | |
|---|---|
| Total iron as Fe2O3 | equal to or less than 0.01 weight percent, |
| Redox ratio | less than 0.200 |
| $CeO_2$ | less than 0.0025 weight percent |
| $ZrO_2$ | less than 0.01 weight percent and |
| $TiO_2$ | less than 0.01 weight percent, and | wherein spectral properties of the glass measured at a thickness 5.5 millimeters comprises:
   a visible transmission of greater than 85% measured using standard illuminant "A" with a 2° observer over a wavelength range of 380 to 770 nanometers;
   a total solar infrared transmittance of greater than 87% measured over a Wavelength range of 775 to 2125 nanometers, and
   a total solar energy transmittance of greater than 90% measured over a wavelength range of 300 to 2500 nanometers, wherein the total solar infrared transmittance and the total solar energy transmittance are calculated using Parry Moon air mass 2.0 direct solar irradiance data and ASTM air mass 1.5 global solar irradiance data respectively, and integrated using the Rectangular Rule and Trapezoidal Rule, respectively.

10. A soda-lime-silica glass, comprising:

| | |
|---|---|
| $SiO_2$ | 65-75 weight percent |
| $Na_2O$ | 10-20 weight percent |
| CaO | 5-15 weight percent |
| MgO | 0-5 weight percent |
| $Al_2O_3$ | 0-5 weight percent |
| $K_2O$ | 0-5 weight percent |
| $SO_3$ | 0-0.30 weight percent | and a colorant portion consisting essentially of:

| | |
|---|---|
| Total iron as $Fe_2O_3$ | greater than 0.01 to 0.12 weight percent, |
| Redox ratio is | less than 0.150, |
| $CeO_2$ | less than 0.0025 weight percent, |
| $ZrO_2$ | less than 0.01 weight percent and |
| $TiO_2$ | less than 0.01 weight percent, and | wherein spectral properties of the glass measured at a thickness 5.5 millimeters comprises:
   a visible transmission of greater than 85% measured using C.I.E. standard illuminant "A" with 2° observer over a wavelength range of 380 to 770 nanometers;
   a total solar infrared transmittance of greater than 87% measured over a wavelength range of 775 to 2125 nanometers, and
   a total solar energy transmittance of greater than 90% measured over a wavelength range of 300 to 2500 nanometers, wherein the total solar infrared transmittance and the total solar energy transmittance are calculated using Parry Moon air mass 2.0 direct solar irradiance data and ASTM air mass 1.5 global solar irradiance data respectively and integrated using the Rectangular Rule and Trapezoidal Rule, respectively.

* * * * *

UNITED STATES PATENT AND TRADEMARK OFFICE
CERTIFICATE OF CORRECTION

PATENT NO.        : 8,304,358 B2
APPLICATION NO.   : 12/275264
DATED             : November 6, 2012
INVENTOR(S)       : Larry J. Shelestak and Ronald L. Schwenninger It is certified that error appears in the above-identified patent and that said Letters Patent is hereby corrected as shown below:

In the Claims

Column 16, Claim 5, line 52 should read

5. The glass according to claim --1-- wherein the redox ratio is in the range of 0.15-0.27.

Signed and Sealed this
Seventeenth Day of December, 2013

Margaret A. Focarino
*Commissioner for Patents of the United States Patent and Trademark Office*